Sept. 6, 1955 S. J. GARTNER ET AL 2,717,092
DEVICE FOR PICKING A LOOSE WIRE FROM ABOUT A SUPPORT
Filed March 2, 1948 3 Sheets-Sheet 2
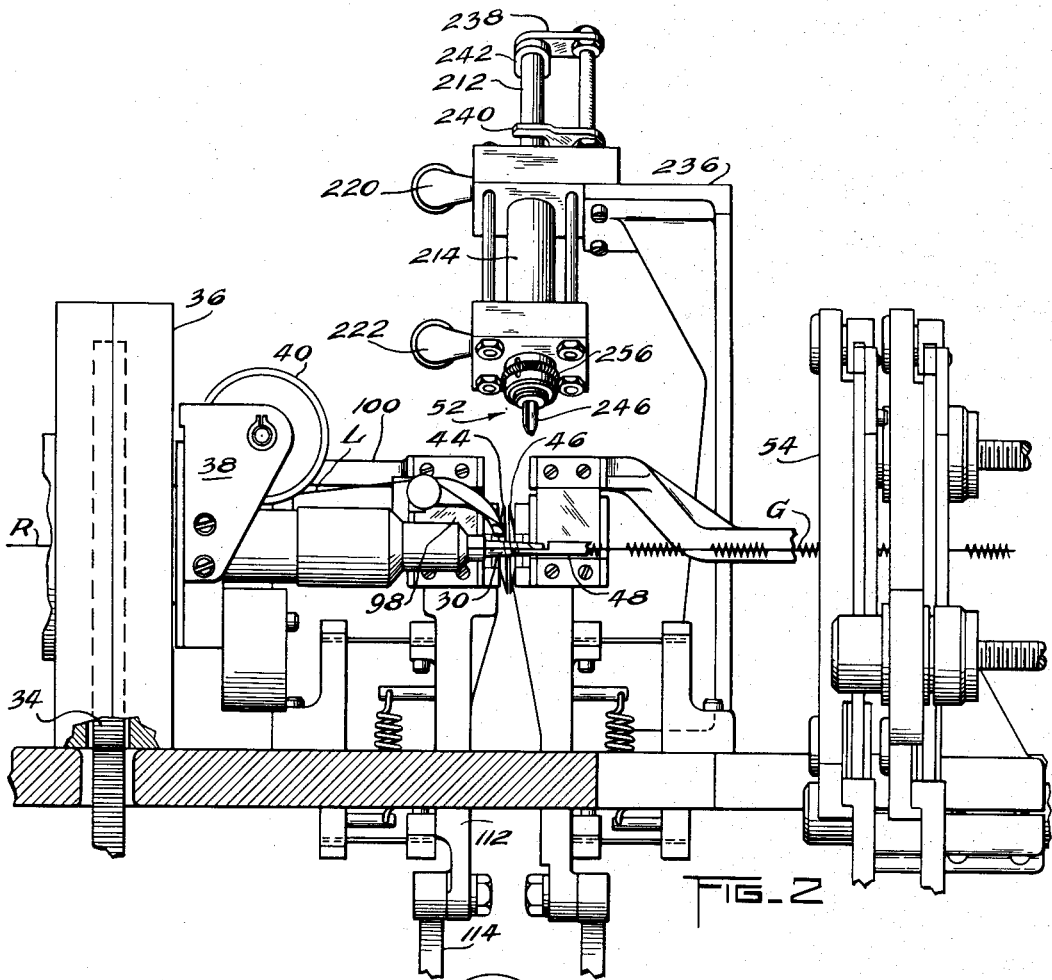
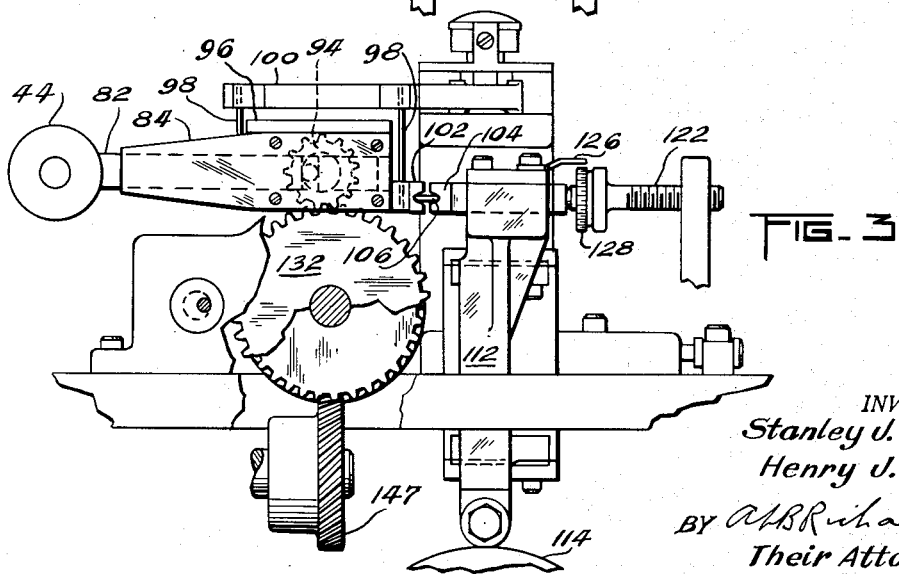
INVENTORS
Stanley J. Gartner
Henry J. Zwald
BY A. B. Richardson
Their Attorney

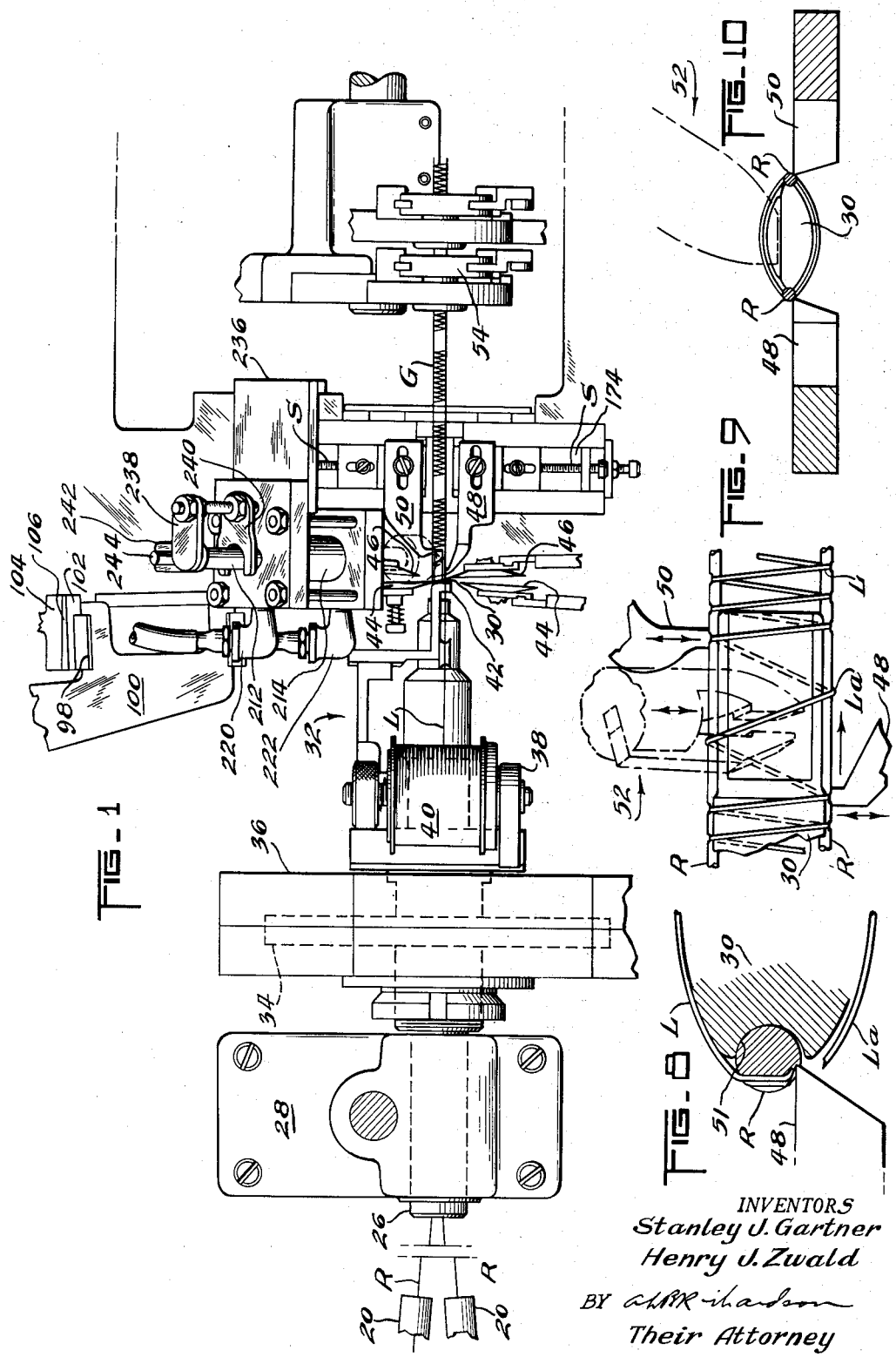

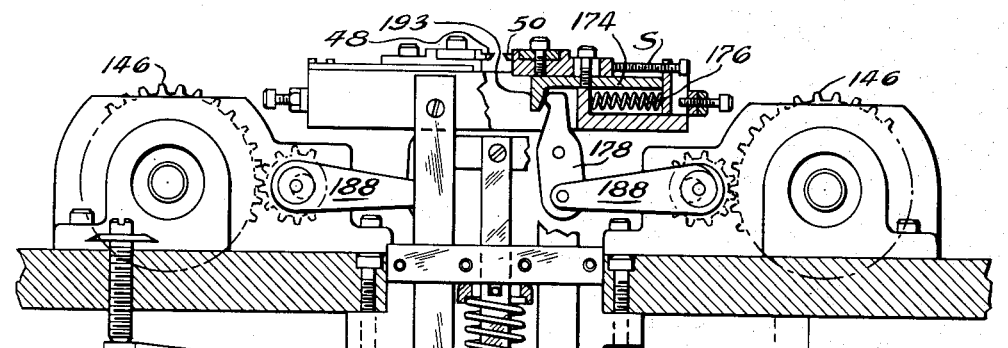
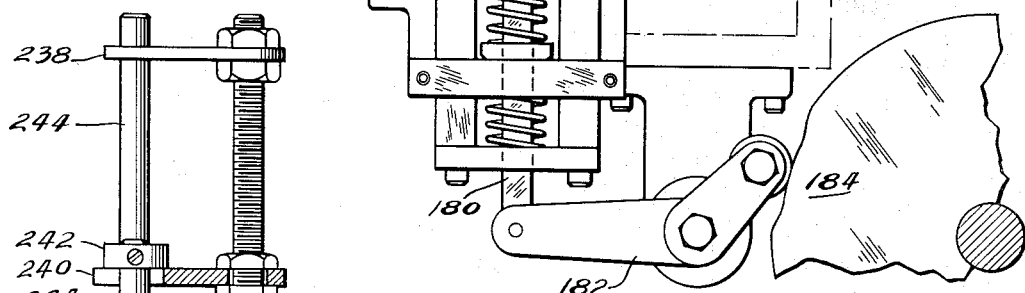
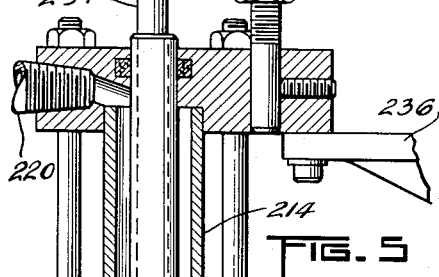
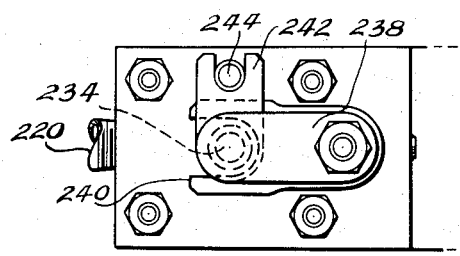
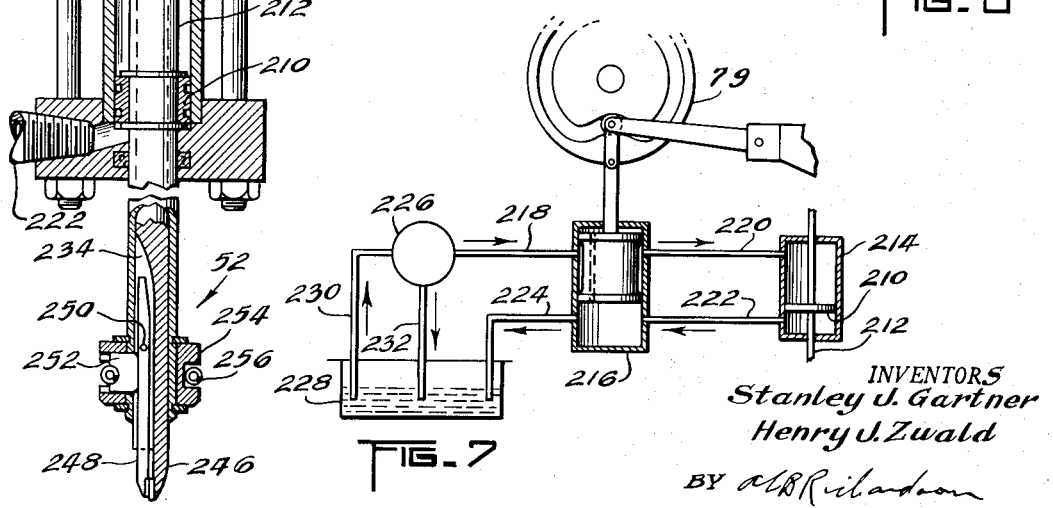

United States Patent Office 2,717,092
Patented Sept. 6, 1955

2,717,092

DEVICE FOR PICKING A LOOSE WIRE FROM ABOUT A SUPPORT

Stanley J. Gartner and Henry J. Zwald, Emporium, Pa., assignors to Sylvania Electric Products Inc., a corporation of Massachusetts Application March 2, 1948, Serial No. 12,646

4 Claims. (Cl. 214—658)

The present invention relates to grid-making machines for electron discharge devices and the like, and in particular to a mechanical picker useful in the manufacture of such grids.

Grids for electron tubes usually include one or more grid side rods and a relatively large number of closely spaced helical grid laterals of fine wire secured to the grid side rods. Each of the grid side rods extends a short distance beyond the fine grid laterals to provide for its accurate orientation and connection in an electron discharge device. Machines for manufacturing this type of grid customarily make a series of notches in the grid side rods, lay the turns of the helical grid laterals successively into the notches, and peen side rod material over each of the notches to secure the grid laterals successively placed. The turns may be evenly spaced for use as screen grids, suppressor grids or sharp cutoff control grids; or the grids may be of variable pitch, as for control grids in variable gain amplifier tubes. Following the winding of the laterals, the side rods of each of the grids are stretched and the strip is then subdivided into the individual grids. The subdivision of the strip is facilitated by the winding of a number of loose or unsecured turns of the helical grid lateral about the grid side rods during a loose turn interval; the loose turns extend about the side rods in the space between the individual grids making up the strip. Following the winding of the loose or unsecured grid lateral turns, the opposite ends of these loose turns are severed. It then becomes necessary to remove such loose turns, prior to severing the grid side rods to form the individual grids.

It is the object of the present invention to provide a mechanical wire picker particularly useful for reliably and accurately removing unwanted turns of grid lateral wire from between individual grids produced by a continuous grid-making machine.

Numerous advantages accrue by using a loose wire remover or picker according to the present invention in a continuous grid making machine, including the removal of the unwanted wire immediately in the vicinity of the winding mandrel and a high degree of accuracy in loose turn removal. These features permit manufacture of precise grids of small dimensions on a mass production basis and in a practical and continuous manner.

The present invention will be more fully understood by reference to the following detailed description which is accompanied by a drawing in which:

Fig. 1 is a plan view of a portion of a machine employing features of the present invention, certain parts of the machine not involved in the present invention being broken away for the sake of clarity;

Fig. 2 is a lateral elevation of the machine shown in Fig. 1 with certain parts broken away and shown in section;

Fig. 3 is an elevational view of one of the notching mechanisms of the machine shown in Fig. 1;

Fig. 4 is an elevational view partly in section, of the loose turn cutting mechanism.

Figs. 5 and 6 are elevational and plan views of the loose turn removing mechanism included in the machine of Fig. 1.

Fig. 7 is a fragmentary sectional view of the hydraulic mechanism for actuating the loose turn removing device of Figs. 5 and 6.

Fig. 8 is an enlarged fragmentary view of the loose turn parting tool in relation to the winding mandrel and side rods.

Fig. 9 is an enlarged fragmentary view of the loose turn remover and its relationship with the winding mandrel, while Fig. 10 is an elevational view, partly in section, illustrating operating relationship between the loose turn removing tool and the winding mandrel.

In Fig. 1, we have shown the arrangement of a grid winding machine wherein relatively heavy side rod wires R are drawn from reels, not shown, through wire straighteners 20 of known construction. These parts specifically form no part of the present invention, but are fragmentarily shown for convenience in understanding the operation of the device.

The side rods are then guided down a dual tube 26, which is fixed to the machine base, not shown, by a split clamp 28. A stationary winding mandrel 30 is supported at the forward end of guide 26. Between clamp 28 and mandrel 30 there is a winding head, indicated generally by an arrow and numeral 32. The winding head also includes a constantly driven gear 34 contained in a casing 36. Rotatable with gear 34 is a frame 38 rotatably and frictionally supporting a reel 40 of grid lateral wire L. A lateral wire guide 42 is carried by frame 38 for accurately leading the lateral wire to the winding mandrel 30. The details and further features of the winding head are discussed more specifically in an earlier application by S. J. Gartner, one of the present applicants, Serial No. 771,995, filed September 3, 1947, to which reference may be made for a more complete description of the portions of the grid winding machine which are not directly involved in the present improvement.

A pair of sharp-edged discs 44 are arranged to reciprocate in alternation at opposite sides of mandrel 30 for notching side rods R, and a pair of blunt-edged discs 46 are similarly arranged for peening the side rod material over the grid lateral wire as it is laid in successive notches previously made by discs 44.

Each tool 44 operates very close to one of the tools 46. Between the time the disc 44 makes its notch, and the time that the adjacent disc 46 peens the lateral wire laid into the notch just formed, the grid side rod advances about half the distance between successive turns of grid lateral winding. The discs 44 and 46 are therefore separated by approximately that distance.

The completed grids and the side rods R are continuously drawn through the machine through the alternate cooperation of drawing heads, one of which is identified by reference numeral 54 and is generally shown in Fig. 1 and Fig. 2.

A detailed disclosure of the operation of the drawing heads, whereby continuous operation of the machine is obtained, may be had by reference to an earlier filed application, Serial No. 771,996, filed September 3, 1947.

The material emerging from mandrel 30 is in the form of a continuous strip G of grid stock which comprises continuous side rods R and helically wound grid lateral L, spaced by gaps where only the side rods are to be found. This spacing is to provide the terminals for the individual grids and a waste zone, which is later cut away, that is deformed by the side rod feeding mechanism. In this region it is desirable that there be no grid laterals. With this purpose in view, the operation of the cutting and peening tools is interrupted for the short stretches between the helically wound grids, which are laid into notches and secured in place, and a series of loose turns is formed by the winding head. The winding machine is arranged to advance the side rod material at an increased rate of speed during the time when the peening and notching tools are not in operation, thereby decreasing amount of grid lateral wire discarded. The number of loose turns of wire to be cut away may thus be as small as one and one half turns. The satisfactory removal of the loose turns thus produced has heretofore been a very serious problem which the present arrangement neatly solves.

The loose turn removal arrangement includes a pair of loose turn parting blades 48 and 50, shown in Fig. 1 in close association with the grid winding and peening structure. The blades 48 and 50 are located at opposite sides of mandrel 30 and are short enough in axial length so that they sever only the ends of the loose turn winding.

In Fig. 8, the parting of a loose turn from the secured turn is shown in a greatly enlarged scale. Mandrel 30, in which groove 51 is formed for receiving and guiding the side rods, is shown with the loose turn removing blade 48 in operative position.

The last secured turn of the grid lateral L is shown severed or broken, or otherwise ruptured from the grid lateral wire L$a$ forming loose turns. The loose turn removing blade is adjusted to operate below the center, but not off the side of the side rod R, and raises the side rod against the upper portion of groove 51. The blade slightly penetrates side rod R and buries, to some extent, the initially peened over end of the grid lateral L into rod R. In this way the possibility of defective grids due to free ends of grid lateral wire is eliminated. Furthermore, it is desirable that the break in the grid lateral wire be made well below the center of the rod R in order to retain the maximum effective length of peening, otherwise the last turn of grid lateral wire L might not be quite so effectively secured in place.

The operating and controlling mechanism for the notching tools 44 and peening tools 46 may be best understood by reference to Fig. 3. The sharp-edged notching discs 44 are supported in place at slight opposite angles to the vertical. In this way the grid lateral wire on opposite sides of the mandrel may be laid in naturally slanted notches to form a good helix. Discs 44 are not fixedly supported, but are so mounted as to permit rotation. Thus, as they operate and rotate slightly they present progressively changing edges to the side rods. The sharpness and accuracy of each disc are thus preserved over long operating periods.

Each disc 44 is mounted on a horizontal slide 82, which is snugly confined in a channelled support 84. The slide 82 is reciprocated by an eccentric on a shaft rotated by spur gear 94. Rotation of gear 94 from a source of power through gears 147 and 132 reciprocates slide 82 longitudinally, and causes notching of the opposed side rods. During the intervals when no notching is to be effected, when loose turns are being wound, the reciprocation of notching tool 44 is not interrupted, but the entire reciprocating assembly is retracted. Thus, the drive and timing of the high speed motion of the tool is maintained during idle intervals, the notching tools being removed from the path of the grid lateral guide 42 as it encircles mandrel 30. For this purpose the pinion housing 96 is suspended for uniform travel by a parallel pair of leaf springs 98, depending from bracket 100. A form of quiet toggle, comprising a pair of grooved members 102 and 104 with an interponent 106 between them, is effective to permit retraction of housing 96 whenever member 104 is lowered. When this occurs a coil spring retracts disc 44 and interrupts the notching. The grooved member 104 is moved into and out of position by a cam follower 112, which rests on cam 114. The reaction of tool 44 is transmitted from housing 96 through interponent 106 and grooved member 104 to an adjustable stop 122. This stop is provided with an indicator 126 and a scale 128 so that the depth of the notch made by tool 44 can be correctly adjusted when the necessary change has been ascertained with the aid of a microscope by the operator in examining the notches made by disc 44.

The depth of penetration of tool 44 is independent of wear occurring on the control cam 114 or its follower 112, since the interponent 106 will always be essentially horizontal when raised. The peening tools 46 are reciprocated at high speed by a pair of pinions and eccentrics in exactly the same manner as just described with reference to the notching discs.

The mechanism for operating the loose turn remover blades 48 and 50 is shown in Fig. 4. These blades are longitudinally and laterally adjustable with respect to the mandrel by means of the screw adjustments S. Therefore, a single pair of blades may be used irrespective of the design of the grid to be wound. The blades are supported in a pair of laterally reciprocable slides 174, which are normally urged toward their retracted position by compression springs 176, only one of which is shown in Fig. 4.

A pair of oscillatory levers 178, one for each slide 174, are carried by a T-shaped vertically shiftable slide 180. This slide is normally urged into elevated position by the compression spring 186, and is retracted by the cam follower lever 182 on cam 184. When the loose turn removing blades are idle, the slide 180 is lowered, thus lowering the actuators 178 so that they do not contact the depending portions 193 of slides 174. These actuators 178 are continuously oscillated at a high rate of speed by cranks 188 on eccentrics driven by gears 146, which are driven by the same means which drive pinions 94 of the peening tools. However, when the high part of cam 184 passes, and spring 186 is effective to raise actuators 178, the latter are effective to quickly reciprocate blades 48 and 50 toward mandrel 30 to breach the ends of loose turn winding. The timing is such that actuators 178 are in their retracted positions during their elevation by spring 186, and the loose turn cutting operation is effected by the drive from eccentrics operating in conjunction with cranks 188. Blades 48 and 50 are effective merely to part the loose turn winding from the peened grid lateral.

A mechanical picker is provided for removing the loose wire while the strip of grid material is still on the mandrel. The details of the picker 52 are shown generally in Figs. 5 and 6. There are two motions to be accomplished by the picker; namely, reciprocation of a pair of jaws to and from mandrel 30, and the opening and closing of these jaws at the proper time. The picker is reciprocated by a hydraulic system including a piston 210 on shaft 212, which moves longitudinally in cylinder 214. By means of a two-way valve 216 (Fig. 7) oil from a constant pressure line 218 can be supplied to either line 220 or line 222 while the remaining line is connected to a return low pressure line 224. A constant pressure pump and relief valve 226 draws its supply from sump 228 through line 230 and the excess pressure relief oil is returned to sump 228 through line 232. The direction of oil flow is indicated by the arrows in Fig. 7. The piston valve 216 is operated by a cam 79 driven in synchronism with the mechanism controlling the advance of the completed grids G.

By reference to Fig. 5 it will be seen that shaft 212, supporting piston 210 within cylinder 214, is of tubular construction and contains a rod 234. The cylinder 214 is supported on a fixed bracket 236, carried by the machine bed plate, and adjustably carries a pair of stops 238 and 240. At the top end of rod 234 there is secured an arm 242, (Fig. 6) which is slotted to receive another rod 244, laterally secured to the upper bulkhead of cylinder 214 for holding the rod 234 against rotation, and for limiting its lengthwise throw. The stops 238 and 240 are set to arrest rod 234 prior to the upper and lower ends of the excursion of shaft 212 for opening and closing the mechanical jaws at the lower part of Fig. 5.

One of the jaws 246 is formed integrally with rod 234 and is called "fixed." The movable jaw 248 moves in a slot in rod 234 and is pivoted at 250. Both of the jaws may be provided with small hardened wear resisting gripping surfaces. In the position shown in Fig. 5, the jaws 248 and 246 are closed, and are held in this configuration by a radial slide 252 carried by a collar 254, and urged radially inward by a coil spring 256 which surrounds collar 254. The tubular shaft 212, and the closed picker jaws 248 and 246 remain in a lowered position for only a brief period after the loose turns have been parted from the remainder of the secured grid lateral wires. The piston 210 commences its upward travel with jaws 246 and 248 closed, as shown. They remain closed until the upper end of rod 234 contacts stop 238. Thereafter, as the tubular shaft 212 continues its motion, it carries collar 254 and radial slide 252 above and beyond the pivot 250 of the movable jaw 248. By the time piston 210 reaches its upper extreme, jaws 246 and 248 are opened by the pressure of spring 256 against the portion of jaw 248, above the pivot point 250, and the loose turn which the jaws picked up at mandrel 30 is released for removal by an air blast, or otherwise suitably collected. When the picker is again returned toward the mandrel for engaging another loose turn winding, collar 254 remains above the pivot 250 until the arm 242 engages stop 240, and until that time the jaws remain open. The continued descent of shaft 212 carries the collar 254 below the pivot 250 and at its lowest extreme jaw 248 closes against jaw 246 to grip the next freed loose turn winding.

Figs. 9 and 10 show the relation of the loose turn picker 52 to the mandrel 30 and the cutting blades 48 and 50. It will be seen that, as blades 48 and 50 cut free the loose grid lateral wire La, the picker 52 comes down to grasp the loose turns. A clearance space is provided in mandrel 30 in the loose turn zone so that jaws 248 and 246 have clearance to grip the loose grid lateral wire La that was previously formed about the generally elliptical portion of the mandrel 30 in the zone of the notching and peening discs.

Numerous modifications of the apparatus of the present invention will occur to those skilled in the art, and accordingly the appended claims should be accorded a latitude of interpretation consistent with the present disclosure.

What we claim is:

1. A hydraulic picker including a cylinder, a movable piston within said cylinder, a hollow piston rod connected to said piston, and another rod within, connected by, and movable with, said hollow piston rod, a fixed jaw and a pivoted jaw carried by said other rod, means for restricting the movement of said other rod to a lesser extent than that of said hollow piston rod and means responsive to relative motion between said piston rod and said other rod for swinging said pivoted jaw.

2. A hydraulic picker including a cylinder, a piston within said cylinder, a hollow piston rod and another rod within said piston rod, a fixed jaw and a pivoted jaw carried by said other rod, and means responsive to relative motion between said hollow rod and said other rod for swinging said pivoted jaw, said last named means including a radially pressed slide bearing against said pivoted jaw and carried by said hollow rod, relative movement between said hollow rod and said other rod serving to move said radial slide to one side or the other of the pivot on said pivoted jaw.

3. A mechanical picker device including a hollow rod, another rod within said hollow rod, means acting on said hollow rod to cause longitudinal reciprocation thereof, carrying said other rod with it, means for limiting the travel of said other rod to a shorter path than that travelled by said hollow rod, a fixed jaw and a pivoted jaw carried by said other rod, and means responsive to relative motion between said hollow rod and said other rod for swinging said pivoted jaw, said last named means including a radially pressed slide bearing against said pivoted jaw and carried by said hollow rod, relative movement between said hollow rod and said other rod serving to move said radial slide to one side or the other of the pivot on said pivoted jaw.

4. A hydraulic picker including a cylinder, a piston within said cylinder, a hollow piston rod connected to said piston to be moved thereby in a forward and a return stroke, another rod within said hollow rod carrying a fixed jaw and a pivoted jaw at one end and having its other end extending through said cylinder, a connection between said piston rod and said pivoted jaw, and stop means acting on the other end of said other rod for limiting the stroke of said other rod relative to the stroke of said piston rod whereby said jaws are opened and closed at opposite ends of said strokes.

References Cited in the file of this patent

UNITED STATES PATENTS

| | | |
|---|---|---|
| 344,222 | Thomas | June 22, 1886 |
| 1,991,816 | Mosely | Feb. 19, 1935 |
| 2,112,119 | Rowe | Mar. 22, 1938 |
| 2,116,569 | Gold | May 10, 1938 |
| 2,188,906 | Lackey | Feb. 6, 1940 |
| 2,332,058 | Cattonar | Oct. 19, 1943 |
| 2,392,799 | Scholes | Jan. 8, 1946 |
| 2,441,228 | Schneider | May 11, 1948 |